US010897521B2

(12) United States Patent
Wang

(10) Patent No.: US 10,897,521 B2
(45) Date of Patent: Jan. 19, 2021

(54) APPLICATION-BASED DATA INTERACTION METHOD AND APPARATUS

(71) Applicant: ADVANCED NEW TECHNOLOGIES CO., LTD., Grand Cayman (KY)

(72) Inventor: Sen Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/460,453

(22) Filed: Jul. 2, 2019

(65) Prior Publication Data
US 2019/0327334 A1 Oct. 24, 2019

Related U.S. Application Data

(63) Continuation of application No. PCT/CN2018/071715, filed on Jan. 8, 2018.

(30) Foreign Application Priority Data

Jan. 19, 2017 (CN) .......................... 2017 1 0043725

(51) Int. Cl.
*H04L 29/08* (2006.01)
*G06Q 20/02* (2012.01)
(Continued)

(52) U.S. Cl.
CPC ............. *H04L 67/32* (2013.01); *G06Q 20/02* (2013.01); *G06Q 20/322* (2013.01); *H04L 29/0602* (2013.01); *H04L 63/18* (2013.01)

(58) Field of Classification Search
CPC ... H04L 51/046; H04L 29/0602; H04L 63/18; H04L 67/20; H04L 67/2804; H04L 67/32; G06Q 20/02; G06Q 20/322
See application file for complete search history.

(56) References Cited

U.S. PATENT DOCUMENTS

| 5,987,611 A | 11/1999 | Freund |
| 7,039,037 B2 | 5/2006 | Wang et al. |
(Continued)

FOREIGN PATENT DOCUMENTS

| CN | 101636998 B | 7/2013 |
| CN | 103532867 A | 1/2014 |
(Continued)

OTHER PUBLICATIONS

Written Opinion of the International Searching Authority and International Search Report for PCT Application No. PCT/CN2018/071715 dated Mar. 28, 2018 (15 pages).

(Continued)

*Primary Examiner* — June Y Sison

(57) ABSTRACT

Methods, systems, and apparatus, including computer programs encoded on computer storage media, for application-based data interaction are provided. One of the methods may be implemented by a networking device. The method may include: receiving a data interaction request through a first channel between a mobile device and the networking device; establishing a second channel for data interaction with a server; determining whether the data interaction request is associated with a preset application; and in response to the determination that the data interaction request is associated with the preset application, opening the second channel.

18 Claims, 4 Drawing Sheets

(51) Int. Cl.
  *G06Q 20/32* (2012.01)
  *H04L 29/06* (2006.01)

(56) References Cited

U.S. PATENT DOCUMENTS

| | | | |
|---|---|---|---|
| 8,898,459 B2 | 11/2014 | Chawla et al. | |
| 9,143,481 B2 | 9/2015 | Wood | |
| 9,392,462 B2 | 7/2016 | Raleigh et al. | |
| 9,497,198 B2 | 11/2016 | Mullick et al. | |
| 9,531,814 B2 | 12/2016 | Cardona-gonzalez et al. | |
| 10,015,102 B2 | 7/2018 | Giaretta et al. | |
| 2008/0034418 A1 | 2/2008 | Venkatraman et al. | |
| 2008/0166995 A1 | 7/2008 | Sun et al. | |
| 2009/0199281 A1 | 8/2009 | Cai et al. | |
| 2010/0166170 A1 | 7/2010 | East et al. | |
| 2012/0166618 A1 | 6/2012 | Dahod et al. | |
| 2012/0188949 A1* | 7/2012 | Salkintzis | H04L 45/308 370/329 |
| 2013/0191275 A1 | 7/2013 | Li et al. | |
| 2014/0036656 A1 | 2/2014 | Chou et al. | |
| 2015/0033311 A1 | 1/2015 | Seed et al. | |
| 2015/0348015 A1 | 12/2015 | Ren et al. | |
| 2016/0283925 A1 | 9/2016 | Lavu et al. | |
| 2017/0017937 A1 | 1/2017 | Lim et al. | |
| 2017/0032527 A1 | 2/2017 | Murthy et al. | |
| 2017/0214734 A1 | 7/2017 | Sun | |
| 2017/0325271 A1* | 11/2017 | Li | H04W 4/023 |

FOREIGN PATENT DOCUMENTS

| | | |
|---|---|---|
| CN | 101933347 B | 4/2014 |
| CN | 104869043 A | 8/2015 |
| CN | 105450585 A | 3/2016 |
| CN | 106130893 A | 11/2016 |
| CN | 106131899 A | 11/2016 |
| CN | 106332119 | 1/2017 |
| CN | 106355392 A | 1/2017 |
| CN | 107018063 A | 8/2017 |
| EP | 1558001 B1 | 6/2006 |
| JP | 2008-067104 A | 3/2008 |
| JP | 2012-514382 A | 6/2012 |
| JP | 2015-142227 A | 8/2015 |
| KR | 101836421 B1 | 3/2018 |
| RU | 2605364 C2 | 12/2016 |
| TW | 200830213 A | 7/2008 |
| TW | 201131490 A | 9/2011 |

OTHER PUBLICATIONS

First Office Action and First Search for Chinese Application No. 201710043725.2 dated May 7, 2019 (5 pages).
Office Action and Search Report for Taiwanese Application No. 106139294 dated Dec. 28, 2018 (8 pages).
Decision to Reject for Taiwanese Application No. 106139294 dated May 29, 2019 (7 pages).
International Preliminary Report on Patentability Chapter I for PCT Application No. PCT/CN2018/071715, dated Aug. 1, 2019 (12 pages).
Second Office Action for Chinese Application No. 201710043725.2, dated Sep. 12, 2019 (8 pages).
Partial Supplementary Search Report for European Application No. 18741740.7, dated Oct. 10, 2019 (12 pages).
Search Report for European Application No. 18741740.7, dated Jan. 17, 2020.
Examination Report for European Application No. 18741740.7, dated Jan. 27, 2020.
Notice of Allowance for Japanese Application No. 2019-538654 dated Sep. 29, 2020.
Notice of Allowance for Korean Application No. 10-2019-7021683 dated Oct. 29, 2020.

* cited by examiner

APPLICATION-BASED DATA INTERACTION METHOD AND APPARATUS

CROSS-REFERENCE TO RELATED APPLICATIONS

The present application is a continuation application of International Application No. PCT/CN2018/071715, filed on Jan. 8, 2018, which claims the benefit of the Chinese Patent Application No. 201710043725.2 filed with the State Intellectual Property Office (SIPO) of the People's Republic China on Jan. 19, 2017. The entire contents of the above-identified applications are incorporated by reference herein.

TECHNICAL FIELD

The present application relates to the field of mobile network technologies, and in particular, to an application-based data interaction method and apparatus.

BACKGROUND

With continuous development of mobile network technologies, mobile applications are increasingly diversified. More and more applications require networks to perform data interaction. These applications may include payment-based applications, entertainment-based applications, and instant messaging-based applications. These applications typically perform data interaction via WIFI or a mobile communication network.

With the current technologies, the inventors have found the following technical problems: in places with dense traffic, such as subways and shopping malls, WIFI signals or mobile communication network signals are relatively weak, and a mobile device may not be able to smoothly connect to the Internet, leading to a poor user experience of the applications.

The deployment of free public WIFI may solve the problem of weak WIFI signals. However, on one hand, the public WIFI has a potential security risk; on the other hand, due to the large number of mobile devices connected to the public WIFI, the experience of data interaction of the applications may be also poor.

Therefore, there is a need to provide a technical solution for a good user experience of data interaction.

SUMMARY

Embodiments of the present specification provide a technical solution for a good user experience of data interaction.

In one aspect, the present specification provides a method for application-based data interaction. The method may be implemented by a networking device. The method may include: receiving a data interaction request through a first channel between a mobile device and the networking device; establishing a second channel for data interaction with an application server; determining whether the data interaction request is associated with a preset application; and in response to the determination that the data interaction request is associated with the preset application, opening the second channel.

In another aspect, the present specification provides another method for application-based data interaction. The method may include: sending a data interaction request from a mobile device to a server, wherein the data interaction request is associated with a preset application on the mobile device; establishing a first channel for data interaction between the mobile device and a networking device; establishing, by the networking device and the server, a second channel for data interaction; selectively opening the first channel and the second channel; and when both the first channel and the second channel are open, performing data interaction according to the data interaction request between the mobile device and the server.

In yet another aspect, the present specification provides another method for application-based data interaction. The method may be implemented on a mobile device, and may include: sending a data interaction request to a server; determining whether the data interaction request is associated with a preset application; in response to the determination that the data interaction request is associated with the preset application, providing an option to establish a first channel between the mobile device and a networking device; in response to receiving an instruction to select the option, establishing the first channel for data interaction between the mobile device and the networking device, wherein the networking device is connected to the server through a second channel; and performing data interaction between the mobile device and the server via the first channel and the second channel.

In a further aspect, the specification further provides an application-based data interaction apparatus. The apparatus may include: a request module configured to send a data interaction request; a selection module configured to establish a first channel for data interaction with a networking device; a bridging module configured to establish, by the networking device and an application server, a second channel for data interaction; a routing module configured to selectively open the first channel and the second channel; and a data interaction module configured to, when both the first channel and the second channel are open, perform data interaction with the application server.

The embodiments of the specification also provide another application-based data interaction apparatus. The apparatus may include: a request module configured to send a preset application-based data interaction request; a selection module configured to, when the preset application-based data interaction request cannot be sent to an application server directly, provide an option to establish a first channel for data interaction with a networking device, and upon receiving an instruction to select the option, establish the first channel; and a first data interaction module configured to perform data interaction with the application server through the first channel.

The embodiments of the present application further provide an application-based data interaction apparatus. The apparatus may include: a bridging module configured to establish a second channel for data interaction with an application server; a second data interaction module configured to receive a data interaction request; and a routing module configured to, when the data interaction request is a preset application-based data interaction request, open the second channel.

The embodiments of the present application further provide another application-based data interaction apparatus. The apparatus may include: a network egress configured to be only connected to a server of a preset application; and a network ingress configured to only open an IP address reserved for the preset application.

The data interaction method and system according to the embodiments of the present specification achieve at least the following advantageous effects: when data interaction with the application server cannot be directly performed, the data interaction with the application server may be indirectly performed through the opened first channel and second channel, thereby improving the user satisfaction of data interaction of the application.

BRIEF DESCRIPTION OF THE DRAWINGS

The accompanying drawings to be described here are used to provide a better understanding of the present application and constitute a part of the present application. The exemplary embodiments of the present application and the description of the exemplary embodiments are used to describe the present application and do not constitute improper limitations to the present application. In the accompanying drawings.

DETAILED DESCRIPTION

To make objectives, technical solutions, and advantages of the present application clearer, the technical solutions of the present application will be clearly and completely described below with reference to the embodiments and the accompanying drawings of the present application. It is obvious that the described embodiments are merely some, but not all, embodiments of the present application. On the basis of the embodiments of the present application, all other embodiments obtainable by one of ordinary skill in the art without creative effort shall fall within the scope of the present application.

Figure 1:
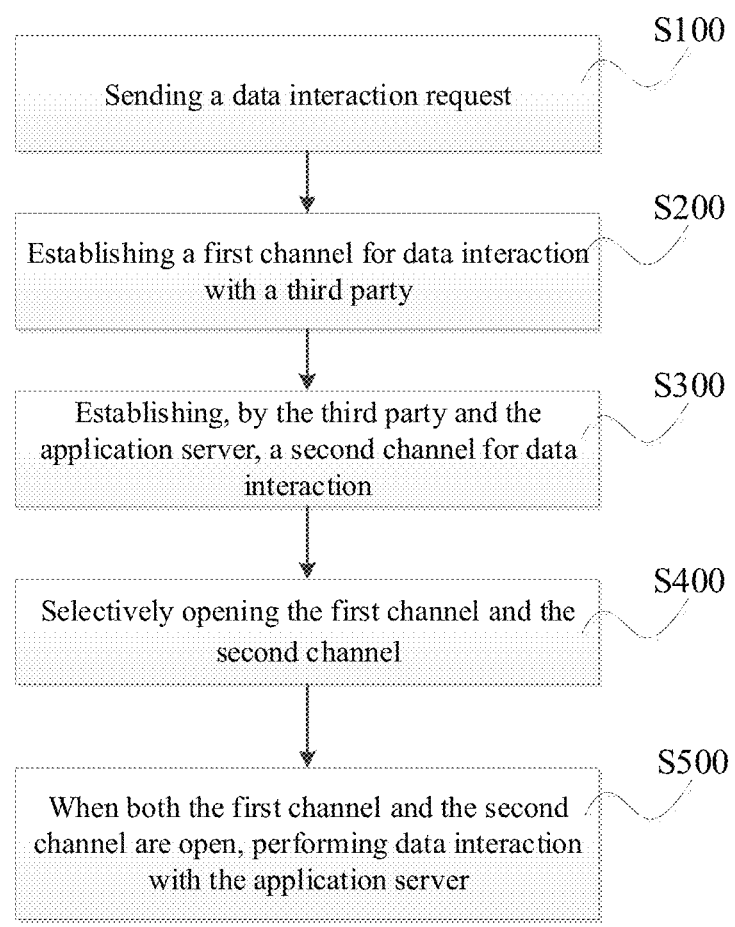
FIG. 1 is a schematic diagram of a process of an application-based data interaction method according to some embodiments of the present specification.

Referring to FIG. 1, a data interaction method of an application according to some embodiments of the present specification comprises the following steps:

S100: sending a data interaction request.

To meet user needs, the mobile applications become increasingly diversified. Many of these applications require networks to perform functions. These applications include, for example, various e-wallets, payment tools, mobile games, instant messaging tools, etc.

When using an application, a network is required to perform data interaction, so that the data on the application server and the local data on the mobile device can be consistent.

An application installed on a mobile device may send a data interaction request. For example, an e-wallet sends a data interaction request for making a payment, a payment tool sends a data interaction request for verifying a payment, a mobile game sends a data interaction request for updating information, and an instant messaging tool sends a data interaction request for receiving a notification message. The data interaction request may be addressed to an application server for serving requested data or providing requested services.

S200: establishing a first channel for data interaction with a third party.

When the application installed on the mobile device sends a data interaction request, the data interaction request may be transferred to the application server by connecting to an Internet node via WIFI. The server performs data interaction in response to the data interaction request. Therefore, the data interaction performed between the mobile device and the application server can support the application's functions. In addition to relying on an Internet node, the data interaction between the mobile device and the application server may also be performed via a mobile communication network, such as a 4G network.

The embodiments of the present specification further provide an alternative solution of data interaction. The data interaction between a mobile device and an application server may be performed via a third-party relay.

In some embodiments of the present specification, the third party is a preset application-based bridging device.

In one example, the "third party" may be an application-specific wireless networking device for bridging between the mobile device and the application server to perform data interaction. In an application example, the third party is customized based on a standard wireless router device, providing network links for specific software or network services, and providing proxy access services to the application software by providing Socks proxy, etc.

In some other embodiments of the present specification, the establishing a first channel for performing data interaction with a third party may include:

when the data interaction request is a preset application-based data interaction request, providing an option to establish a first channel for data interaction with a third party; and upon receiving an instruction to select the option, establishing the first channel.

In some embodiments, a preset application-based data interaction request may refer to a data interaction request that is associated with a preset application. For example, the mobile device is installed with a payment application and other applications. The "third party" is particularly a payment application-based bridging device. When the data interaction request is a payment application-based data interaction request, i.e., the data interaction request is associated with the payment application, the payment application provides an establishing option for a user to select. When the payment application receives an instruction that the option is selected by the user, the mobile device establishes a first channel capable of data interaction with the third party. When the data interaction request is not based on the payment application but based on another application, for example, an instant messaging application, the option for establishing a first channel capable of data interaction between the mobile device and a third party may not be provided.

When data interaction can be performed via a conventional path, such as private WIFI, public WIFI, mobile communication network, etc., the user may still select data interaction via a third-party relay. Since the third party is a preset application-based bridging device, the security may be ensured, and moreover, the data interaction efficiency may be ensured.

In one embodiment, the method further comprises:

when a preset application-based data interaction request cannot be sent to an application server directly, providing the establishing option.

In places with dense traffic, such as high-speed rail stations, train or bus stations, shops, etc., signals in a conventional path, such as private WIFI, public WIFI, mobile communication networks, etc., may be affected and become weak. When the preset application-based data interaction request cannot be sent to an application server directly, the application provides an establishing option. When an instruction to select the option is received, the first channel is established between the mobile device and the third party. The data interaction between the mobile device and the application server is transferred via the third party, thereby ensuring a smooth data interaction and improving the user satisfaction of the application.

S300: establishing, by the third party and the application server, a second channel for data interaction.

The second channel for data interaction may be established between the third party and the application server via fiber-optic broadband, a dedicated network, etc. For example, the second channel for data interaction may be established via telecommunication broadband or a local area network.

S400: selectively opening the first channel and the second channel.

In another embodiment of the present specification, the selectively opening the first channel and the second channel comprises: when the data interaction request is a preset application-based data interaction request, opening the first channel and the second channel.

The mobile device is connected to the application server through the first channel and the second channel. When the data interaction request is a preset application-based data interaction request, the first channel and the second channel are opened for data interaction. When the data interaction request is not a preset application-based data interaction request, at least one of the first channel and the second channel intercepts the data interaction request. In one example, the interception may be performed in either the first channel or the second channel, or the interception may also be performed in both the first channel and the second channel. Only a preset application-based data interaction request may pass through the first channel and the second channel. This way, the preset application-based data interaction request and the preset application-based data interaction have exclusive access to the first channel and the second channel between the mobile device and the application server, thereby improving the data interaction efficiency and improving the degree of user satisfaction.

S500: when both the first channel and the second channel are open, performing data interaction with the application server.

When both the first channel and the second channel are open, data interaction is performed between the mobile device and the application server via a third-party relay.

Furthermore, in some other embodiments of the present specification, the preset application is a payment application or a payment offset application.

In the embodiments of the present specification, when data interaction with the application server cannot be directly performed, data interaction with the application server may be indirectly performed through the opened first channel and second channel, thereby improving the user satisfaction of data interaction of the application.

The above-described is an implementation process of the application-based data interaction method. A process of implementing the application-based data interaction method at the mobile device side will be described below.

Figure 2:
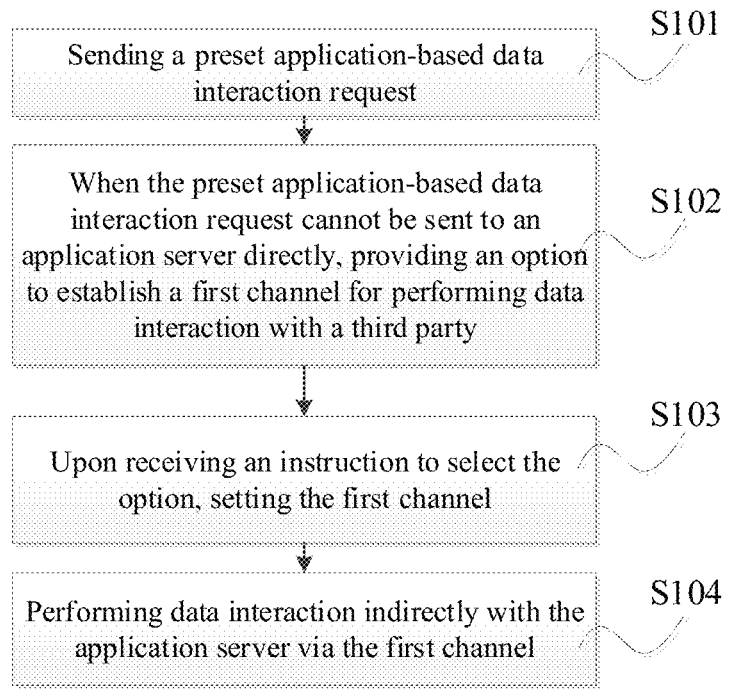
FIG. 2 is a schematic diagram of a process of another application-based data interaction method according to some embodiments of the present specification.

FIG. 2 illustrates the process of implementing, at the mobile device side, the application-based data interaction method according to some embodiments of the present specification.

S101: sending a preset application-based data interaction request.

A preset application of the mobile device may send a data interaction request during executing a function. For example, an e-wallet sends a data interaction request for making a payment, a payment tool sends a data interaction request for verifying a payment, a mobile phone game sends a data interaction request for updating information, and an instant messaging tool sends a data interaction request for receiving a notification message.

In some embodiments, the mobile device may send a data interaction request, and determine whether the data interaction request is associated with a preset application. In response to the determination that the data interaction request is associated with the preset application, the mobile device may provide an option to establish a first channel between the mobile device and a networking device.

S102: when the preset application-based data interaction request cannot be sent to an application server directly, providing an option to establish a first channel for data interaction with a third party.

In places with a dense traffic, such as high-speed rail stations, train or bus stations, shops, etc., signals in a conventional path, such as private WIFI, public WIFI, mobile communication network, etc., may be affected and become weak. When the preset application-based data interaction request cannot be sent to an application server directly, the application provides the establishing option.

S103: upon receiving an instruction to select the establishing option, establishing the first channel.

When an instruction that the establishing option is selected is received, the first channel is established between the mobile device and the third party.

S104: performing data interaction indirectly with the application server through the first channel.

The data interaction between the mobile device and the application server is transferred via the third party, thereby ensuring a smooth data interaction and improving the user satisfaction of the application.

Furthermore, in some other embodiments of the present specification, the preset application is a payment application or a payment offset application.

In the embodiments of the present specification, when the preset application-based data interaction request cannot be sent to an application server directly, data interaction with the application server may be indirectly performed through the opened first channel, thereby improving the user satisfaction of data interaction of the application.

The above-described is a process of implementing the application-based data interaction method at the mobile device side. A process of implementing the application-based data interaction method at a third party will be described below.

Figure 3:
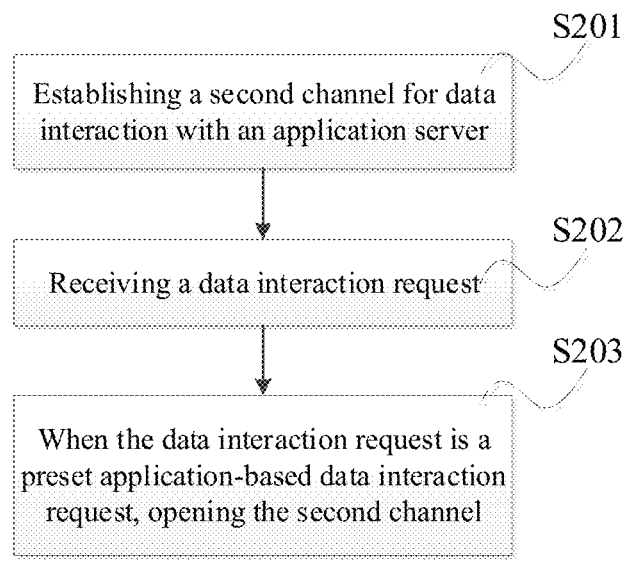
FIG. 3 is a schematic diagram of a process of another application-based data interaction method according to some embodiments of the present specification.

FIG. 3 illustrates the process of implementing, at a third party, the application-based data interaction method according to some embodiments of the present specification.

S201: establishing a second channel for data interaction with an application server.

The second channel for data interaction may be established between the third party and the application server via fiber-optic broadband, dedicated networks, etc. For example, the second channel for data interaction may be established via telecommunication broadband or a local area network.

S202: receiving a data interaction request.

As seen in the description above, the data interaction request sent by the mobile device may be received by the third party. The data interaction request may be a preset application-based data interaction request, such as a payment application-based data interaction request—a request for making a payment or an offset request for a payment. The data interaction request may also not be a preset application-based data interaction request, such as a data interaction request for accessing movie & TV data.

S203: when the data interaction request is a preset application-based data interaction request, opening the second channel.

The third party filters the data interaction request. The third party is a preset application-based bridging device. For example, the third party may determine whether the data interaction request is from a preset application, and in response to the determination that the data interaction request is from a preset application, the third party opens the second channel. In some embodiments, the third party is a payment application-based bridging device, when the data interaction request is a payment application-based data interaction request, the third party opens the second channel.

The third party may manage data interaction requests of preset applications. For example, the third party may open the second channel for a type of data interaction requests. For example, the third party may open the second channel for a payment application-based data interaction request. For other types of data interaction requests, the third party may decide whether to open the second channel according to actual situations. For example, the third party may also open the second channel for a payment offset application-based data interaction request. The third party may close the second channel for a data interaction request for accessing movie & TV data.

In some embodiments, the method further comprises: when the data interaction request is not a preset application-based data interaction request, closing the second channel.

The third party may manage data interaction requests of preset applications. For a preset application-based data interaction request, the third party may open the second channel, while for all data interaction requests based on applications other than the preset applications, the third party closes the second channel.

In some other embodiments, the preset application is a payment application or a payment offset application.

In the embodiments of the present specification, the third party may manage data interaction requests of preset applications. When the preset application-based data interaction request cannot be sent to an application server directly, the preset application-based data interaction may be performed through the second channel, and ultimately data interaction is performed with the application server, thereby improving the user satisfaction of data interaction of the application.

Figure 4:
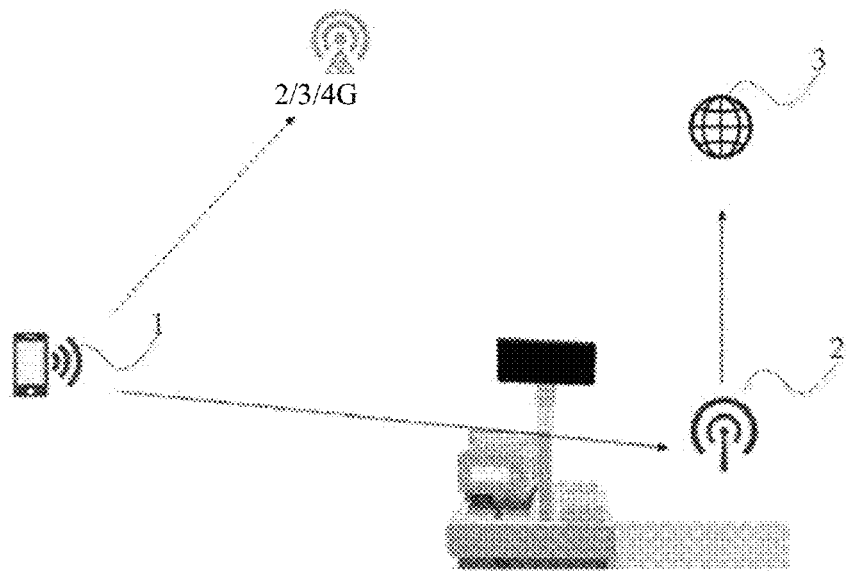
FIG. 4 is a schematic diagram of an application-based data interaction scenario according to some embodiments of the present specification.

Referring to FIG. 4, an exemplary application scenario of the present specification will be described below.

For example, a payment application and an instant messaging application are installed on a mobile device 1. A third party 2 establishes a second channel with a server 3 of the payment application via a broadband. When a user uses the payment application to make a payment, the payment application prompts the user that an establishing option may be selected. The user may decide whether to select the establishing option according to the current network communication status. When the current network communication status is good, the user may select the establishing option as a backup. When the mobile device receives an instruction that the establishing option is selected, the mobile device establishes a first channel between the mobile device 1 and the third party 2. The mobile device 1 and the third party 2 are connected through the first channel. When the current network communication state is poor and none of the conventional paths, such as private WIFI, public WIFI, mobile communication networks, etc., is able to complete the payment, the user may select the establishing option. When the mobile device receives an instruction that the establishing option is selected, the mobile device 1 establishes a first channel between the mobile device 1 and the third party 2. The mobile device 1 and the third party 2 are connected through the first channel. When the mobile device 1 sends an instant messaging application-based data interaction request, the instant messaging application-based data interaction request is intercepted as the instant messaging application is not a preset application that is supported by the third party 2. In other words, the second channel is closed to the instant messaging application-based data interaction request. When the mobile device 1 sends a payment application-based data interaction request, the second channel is opened, as the payment application is a preset application that is supported by the third party 2. Data interaction may be performed between the mobile device 1 and the application server 3 via third party 2. The application server 3 responds to the data interaction request, and the data interaction is performed between the mobile device 1 and the application server 3.

Figure 5:
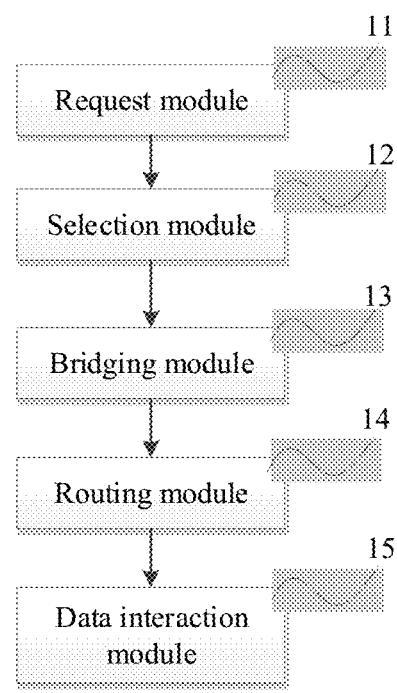
FIG. 5 is a schematic structural diagram of an application-based data interaction apparatus according to some embodiments of the present specification.

The above-described is an application-based data interaction method according to the embodiments of the present specification. Based on the same concept, referring to FIG. 5, the present specification further provides an application-based data interaction apparatus, comprising:

a request module 11 configured to send a data interaction request;

a selection module 12 configured to establish a first channel for data interaction with a third party;

a bridging module 13 configured to establish, by the third party and an application server, a second channel for data interaction;

a routing module 14 configured to selectively open the first channel and the second channel; and a data interaction module 15 configured to, when both the first channel and the second channel are open, perform data interaction with the application server.

In one embodiment, the selection module 12 is configured to:

when the data interaction request is a preset application-based data interaction request, provide an option to establish a first channel for data interaction with the third party; and upon receiving an instruction to select the option, establish the first channel.

Furthermore, in some other embodiments of the present specification, the selection module 12 is further configured to when the preset application-based data interaction request cannot be sent to an application server directly, provide the establishing option.

In another embodiment, the third party is a preset application-based bridging device.

In yet another embodiment, the routing module 14 is configured to when the data interaction request is a preset application-based data interaction request, open the first channel and the second channel.

In some embodiments, the preset application is a payment application or a payment offset application.

Figure 6:
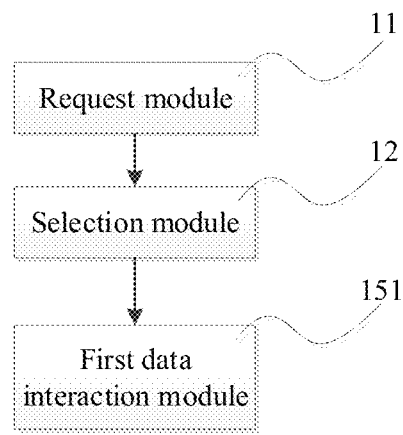
FIG. 6 is a schematic structural diagram of another application-based data interaction apparatus according to some embodiments of the present specification.

Referring to FIG. 6, the present specification further provides an application-based data interaction apparatus, comprising:

a request module 11 configured to send a preset application-based data interaction request;

a selection module 12 configured to when the preset application-based data interaction request cannot be sent to an application server directly, provide an option to establish a first channel for data interaction with a third party, and upon receiving an instruction to select the option, establish the first channel; and a first data interaction module 151 configured to perform data interaction indirectly with the application server through the first channel.

In some other embodiments, the preset application is a payment application or a payment offset application.

Figure 7:
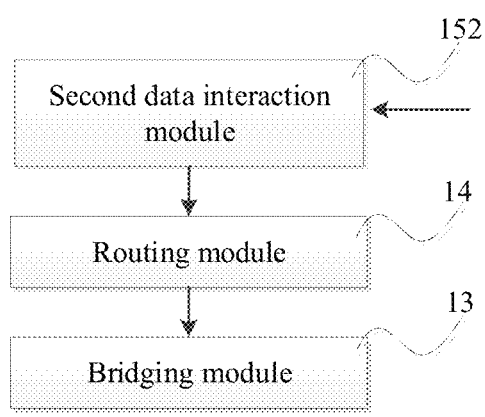
FIG. 7 is a schematic structural diagram of another application-based data interaction apparatus according to some embodiments of the present specification.

Referring to FIG. 7, the present specification further provides an application-based data interaction apparatus, comprising:

a bridging module 13 configured to establish a second channel for data interaction with an application server;

a second data interaction module 152 configured to receive a data interaction request; and a routing module 14 configured to, when the data interaction request is a preset application-based data interaction request, open the second channel.

Furthermore, in some other embodiments of the present specification, the routing module 14 is further configured to, when the data interaction request is not a preset application-based data interaction request, close the second channel.

Furthermore, in some other embodiments of the present specification, the preset application is a payment application or a payment offset application.

The present specification further provides an application-based data interaction apparatus, the apparatus may include:

a network egress, configured to be only connected to a server of a preset application; and a network ingress, configured to only open an IP address reserved for a preset application.

In one example, the application-based data interaction apparatus may be a wireless networking device specific to the application for bridging between the mobile device and the application server to perform data interaction. In another example, the application-based data interaction apparatus may be customized based on a standard wireless router device and providing network links for particular software or network services, and providing proxy access services by providing Socks proxy, etc. A firewall is provided between the application-based data interaction apparatus and the preset application server. A preset application-based data interaction request may pass this firewall, while data interaction requests not based on the preset application may be intercepted. A port of the application-based data interaction apparatus is configured to be open only to an IP address reserved for the preset application. For example, an IP address reserved for a preset application is 192.168.1.100. Then, the DHCP (Dynamic Host Configuration Protocol) of the application-based data interaction apparatus is configured to be: device IP 192.168.1.100, subnet mask 255.255.255.0, and routing IP 192.168.1.1. This way, the preset applications may access the application-based data interaction apparatus, while other applications may not access the application-based data interaction apparatus, thereby reducing the data interaction burden on the application-based data interaction apparatus.

One of ordinary skill in the art should understand that the embodiments of the present invention may be provided as a method, a system, or a computer program product. Therefore, the present invention may be implemented as a complete hardware embodiment, a complete software embodiment, or an embodiment combining software and hardware. Moreover, the present invention may be in the form of a computer program product implemented on one or more computer usable storage media (including, but not limited to, a magnetic disk memory, CD-ROM, an optical memory, etc.) comprising computer usable program codes.

The present invention is described with reference to flowcharts and/or block diagrams of the method, device (system), and computer program product according to the embodiments of the present invention. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash memory (flash RAM). The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EE- PROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. According to the definitions in the specification, the computer readable media do not include transitory media, such as modulated data signals and carriers.

It should be further noted that the terms of "including," "comprising," or any other variants of the terms are intended to encompass a non-exclusive inclusion, causing a process, method, commodity, or device comprising a series of elements to not only comprise these elements, but also comprise other elements that are not clearly listed, or further comprise elements that are inherent to the process, method, commodity, or device. When there is no further restriction, elements defined by the statement "comprising one . . . " does not exclude that a process, method, commodity, or device comprising the above elements further comprises additional identical elements.

One of ordinary skill in the art should understand that the embodiments of the present application may be provided as a method, a system, or a computer program product. Therefore, the present application may be implemented as a complete hardware embodiment, a complete software embodiment, or an embodiment combining software and hardware. Moreover, the present application may be in the form of a computer program product implemented on one or more computer usable storage media (including, but not limited to, a magnetic disk memory, CD-ROM, an optical memory, etc.) comprising computer usable program codes.

The above-described is only embodiments of the present application, which are not used to limit the present application. To one of ordinary skill in the art, the present application may have various modifications and changes. Any modification, equivalent substitution, or improvement made within the spirit and principle of the present application shall be encompassed by the claims of the present application.

What is claimed is:

1. An application-based data interaction method, comprising:
   determining whether a data interaction request is associated with a preset payment application on a mobile device;
   opening a first channel for data interaction between the mobile device and a networking device;
   opening a second channel for the data interaction between the networking device and a payment application server; and
   when the data interaction request is associated with the preset payment application on the mobile device, performing the data interaction according to the data interaction request between the mobile device and the server through the first channel and the second channel;
   wherein when the data interaction request is not associated with the preset payment application on the mobile device, at least one of the first channel and the second channel intercepts the data interaction request, thereby providing data interaction requests associated with the preset payment application with exclusive access to the first channel and the second channel between the mobile device and the payment application server.

2. The method according to claim 1, prior to opening the first channel, the method further comprising establishing the first channel for the data interaction between the mobile device and the networking device.

3. The method according to claim 2, wherein establishing the first channel for the data interaction comprises:
   providing an option to establish the first channel for the data interaction between the mobile device and the networking device; and
   upon receiving an instruction to select the option, establishing the first channel.

4. The method according to claim 1, wherein prior to opening the second channel, the method further comprising establishing the second channel for the data interaction between the networking device and the server.

5. The method according to claim 1, wherein the networking device is a preset application-based bridging device.

6. The method according to claim 1, wherein the preset application is a payment offset application.

7. An application-based data interaction method to be implemented by a mobile device, comprising:
   determining whether a data interaction request is associated with a preset payment application on the mobile device;
   in response to the determination that the data interaction request is associated with the preset payment application, opening a first channel for data interaction between the mobile device and a networking device, wherein the networking device is connected to a payment application server through a second channel; and
   when the data interaction request is associated with the preset payment application on the mobile device, performing the data interaction between the mobile device and the server through the first channel and the second channel;
   wherein when the data interaction request is not associated with the preset payment application on the mobile device, at least one of the first channel and the second channel intercepts the data interaction request, thereby providing data interaction requests associated with the preset payment application with exclusive access to the first channel and the second channel between the mobile device and the payment application server.

8. The method according to claim 7, prior to opening the first channel, the method further comprising establishing the first channel for the data interaction between the mobile device and the networking device.

9. The method according to claim 8, wherein establishing the first channel for the data interaction comprising:
   providing an option to establish the first channel between the mobile device and the networking device; and
   in response to receiving an instruction to select the option, establishing the first channel for data interaction between the mobile device and the networking device.

10. The method according to claim 7, wherein the networking device is a preset application-based bridging device.

11. The method according to claim 7, further comprising:
    in response to the determination that the data interaction request is not associated with the preset application, keeping the first channel closed.

12. The method according to claim 7, wherein the preset application is a payment offset application.

13. Non-transitory computer-readable media configured with instructions executable by one or more processors to cause the one or more processors to perform operations comprising:

determining whether a data interaction request is associated with a preset payment application on a mobile device;

opening a first channel for data interaction between the mobile device and a networking device;

opening a second channel for the data interaction between the networking device and a payment application server; and when the data interaction request is associated with the preset payment application on the mobile device, performing the data interaction according to the data interaction request between the mobile device and the server through the first channel and the second channel;

wherein when the data interaction request is not associated with the preset payment application on the mobile device, at least one of the first channel and the second channel intercepts the data interaction request, thereby providing data interaction requests associated with the preset payment application with exclusive access to the first channel and the second channel between the mobile device and the payment application server.

14. The non-transitory computer-readable media according to claim 13, wherein prior to opening the first channel, the operations further comprise establishing the first channel for the data interaction between the mobile device and the networking device.

15. The non-transitory computer-readable media according to claim 14, wherein establishing the first channel for the data interaction comprises:

providing an option to establish the first channel for the data interaction between the mobile device and the networking device; and upon receiving an instruction to select the option, establishing the first channel.

16. The non-transitory computer-readable media according to claim 13, wherein prior to opening the second channel, the operations further comprise establishing the second channel for the data interaction between the networking device and the server.

17. The non-transitory computer-readable media according to claim 13, wherein the networking device is a preset application-based bridging device.

18. The non-transitory computer-readable media according to claim 13, wherein the preset application is a payment offset application.

* * * * *